Sept. 27, 1927.  F. NIEHAUS  1,643,748
LIME SPREADER
Filed Oct. 4, 1926  2 Sheets-Sheet 1

INVENTOR:
FRANK NIEHAUS
ATTORNEY.

Sept. 27, 1927.
F. NIEHAUS
1,643,748
LIME SPREADER
Filed Oct. 4, 1926
2 Sheets-Sheet 2
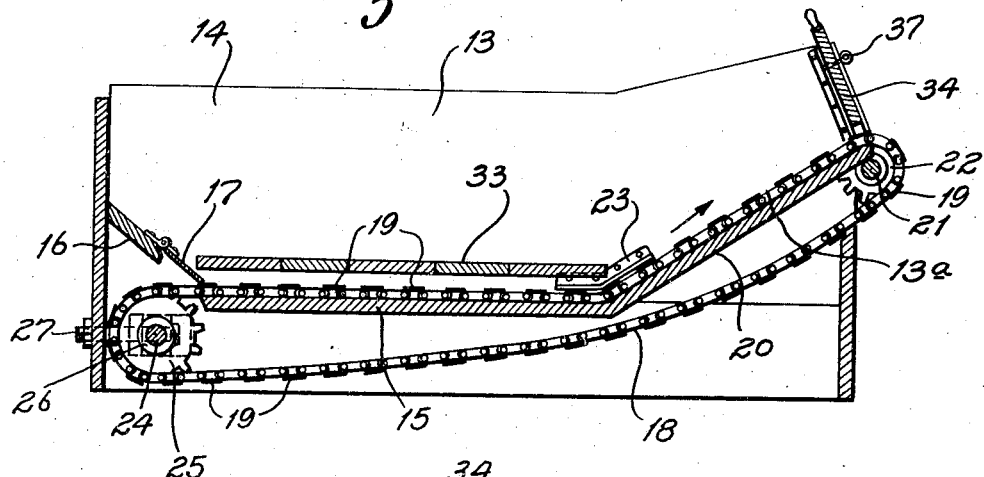
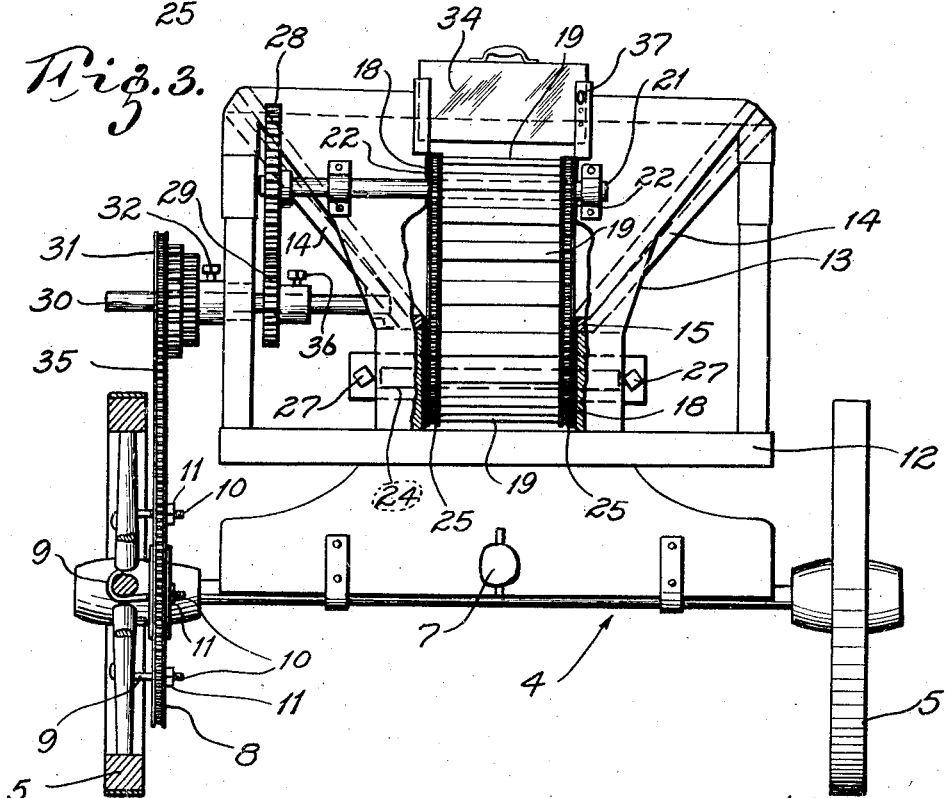
INVENTOR:
FRANK NIEHAUS.
By Edward E. Longan
ATTORNEY.

Patented Sept. 27, 1927.

1,643,748

UNITED STATES PATENT OFFICE.

FRANK NIEHAUS, OF BUTLER, ILLINOIS.

LIME SPREADER.

Application filed October 4, 1926. Serial No. 139,377.

My invention relates to improvements in lime spreaders, and has for its primary object a device which can be readily mounted on the running gear of an ordinary farm wagon for distribution of pulverized lime stone, slaked lime, pulverized fertilizer, and the like, over a field.

A further object is to construct a device for the above mentioned purpose by which the distribution of the material can be regulated by means of a valve.

A still further object is to construct a devise by means of which the distribution of material for treating soil can be regulated as to quantity by increasing or decreasing the speed of the distributing device.

My device is primarily intended for treating soil with certain chemicals or minerals, principally crushed lime stone, and by its construction and operation I can apply a predetermined amount of said material over a predetermined space of ground.

In the drawings:

Fig. 2 is a longitudinal central section of my device removed from the running gear; and Fig. 3 is a rear view of Fig. 1.

Figure 1:
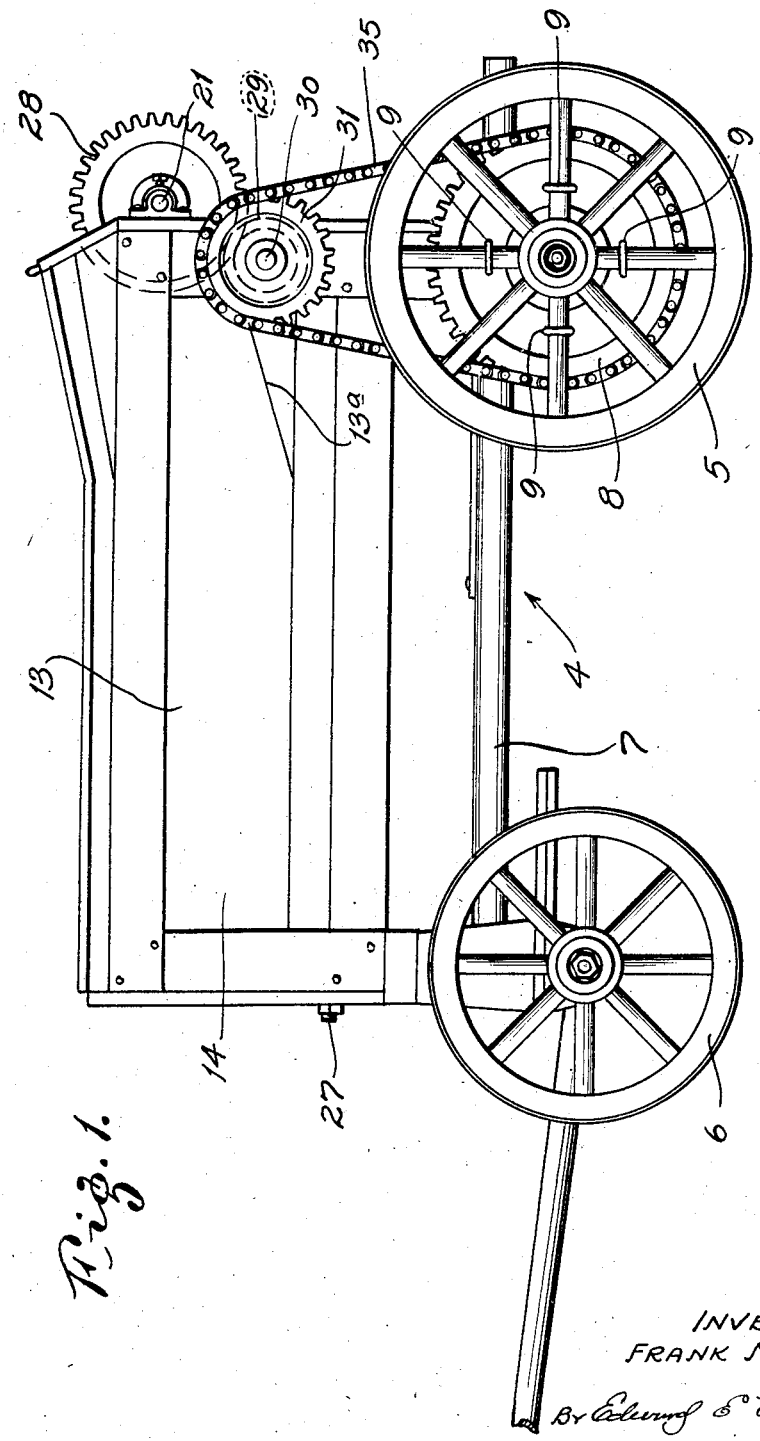
Fig. 1 is a side elevation of the running gear of a farm wagon with parts broken away and in section showing my device in position thereon.

In carrying out my invention I employ a running gear 4, which running gear is the same as used for an ordinary farm wagon and which has rear wheels 5, front wheels 6, and a coupling pole 7. To one of the rear wheels 5 is attached a sprocket wheel 8. This sprocket wheel is of relatively large size and is provided with openings through which hooks 9 extend. These hooks are screw threaded on one end as indicated by the numeral 10 to receive the nut 11 and are designed to have their hooked ends pass around certain spokes so that the sprocket wheel when in position will rotate with the wheel. The sprocket wheel is made concentric with the rear wheel by being bored out so as to snugly fit over the hub of the wheel.

Resting in the frame of the running gear is a body support 12 which carries the body or container 13. This container has its sides 14 inclined inwardly and downwardly meeting in a bottom or apron 15 which is spaced rearwardly from the front wall of the container. The forward portion of the container is supplied with a downwardly and rearwardly sloping portion 16 which carries a hinged apron 17. Traveling over the apron 15 is a double conveyor chain 18 across which slats 19 are secured at intervals thus making a slat conveyor. The rear end of the container is inclined upwardly as at 13ª. The apron 15 is also provided with an upwardly inclined portion 20 which terminates above and beyond the shaft 21 on which sprocket wheels 22 are mounted. The conveyor chain passes around these sprockets and in order to keep the chain conveyor in close proximity to the apron 15 and the inclined portion 20, I supply guides 23 at the point where these two portions meet. These guides extend above the chain and prevent it from raising up when in operation.

Adjacent the front of the container is located the shaft 24 which is provided with sprocket wheels 25 around which the chains of the conveyor pass. The shaft 24 is mounted in bearings 26 which are slidably mounted so that they can be moved backward and forward by means of the adjusting screws 27. These adjusting screws are for the purpose of taking up excess slack. Mounted on the shaft 21 is a gear wheel 28 which meshes with a gear 29. The gear 29 is mounted on a shaft 30. This shaft projects through the frame 12 and has mounted thereon a step sprocket 31. This step sprocket is composed of three integral sprocket wheels of different diameter and is slidably secured to the shaft 30 by means of a set screw or other fastening means 32 so that the step gear can be shifted sidewise and thus regulate the speed at which the shaft 30 is driven in proportion to the travel of the vehicle thereby controlling the speed of the conveyor.

Located above the conveyor and within the container 13 is a false bottom 33. This bottom is so constructed of laterally extending boards or sections and is designed to bear most of the weight of the material within the container but is so arranged that as the material is carried away and delivered in the field, it can be gradually removed. In this way the conveyor does not have the full weight of the load resting upon it and makes my device easy to move over the ground whereas if the full weight of the material were resting on the conveyor, it would require a great amount of power to draw the device over the ground for the reason that the resistance offered to the conveyor would be added to the resistance of drawing the device over the ground in addition to the load.

At the rear end of the container 13 is a gate 34 which is slidably mounted so that it can be raised and lowered, thus increasing the space between the gate and the conveyor and permitting more or less material to be discharged at a time. This regulation however is separate and distinct from the speed regulation thereby giving it a double control on a quantity of material delivered. In this way I can accurately control the delivery of the material to the ground either by raising or lowering the gate or by increasing or decreasing the speed of the conveyor.

The operation of my device is as follows:

The frame 12 together with the container is placed on the running gear of a vehicle, the one rear wheel removed and the sprocket 8 secured in position by means of the hooks 9. The sprocket chain 35 is then placed around the sprocket 8 and one of the stepsprockets 31, links being removed or added as required to take care of the variations in diameter of the steps of the last mentioned sprocket. The false bottom 33 is then placed in position and the device loaded with the material to be distributed. In this connection I desire to state that the gear 29 is also slidably mounted and secured to the shaft 30 by means of a set-screw 36 so that it can be moved out of mesh with the gear 28. This permits me to drive the wagon to a predetermined point before starting the device in operation, in other words by shifting the gear 29 so that it is out of mesh, the conveyor will not be placed in operation until a desired point has been reached. Upon reaching the point of distribution, I adjust the gate 34 to a predetermined height according to the quantity of material to be distributed. The gear 29 is then pushed over so as to be in mesh with the gear 28 and the device is ready to commence distributing.

Forward movement of the device now moves the conveyor in the direction indicated by the arrow in Fig. 2 and the slats carry the material up on the apron 15 and the inclined portion 20 discharging it over the rear of the vehicle. As the load at the rear of the container sinks down due to distribution, it will gradually reach such a point that no more will fall on the conveyor. Just before this point is reached, I remove one of the boards of the false bottom thus restoring the supply of material from the container to the conveyor. This is continued until the entire load has been discharged. In the meantime the hinged apron 17 moves up and down as the slats pass thereunder and effectuately prevents material from falling through the space between the apron and the front wall of the container.

If more material is desired to be discharged, I either raise the gate 34 slightly or loosen the set screw 32 and shift over the step sprocket 31 so as to obtain a faster drive. This faster drive however is only desirable when the gate 34 is down fairly low so that the conveyor will not have to drag out a whole lot of material but by raising the gate 34, a large amount of material can be discharged without increasing the speed of the conveyor. The adjustment of the gate is controlled by means of pins 37 which pass through the gate and through openings in the slide in which the gate is mounted.

Having fully described my invention, what I claim is:

A lime spreader adapted to be mounted on a wheeled support comprising a container having a front wall, inwardly and downwardly inclined side walls, a rear wall, and a bottom, said bottom being spaced rearwardly of the front wall and having its rear end upwardly inclined, a conveyor passing around said bottom, guides carried by the side wall adjacent the inclined portion for holding said conveyor against the bottom, a hinged apron carried by the front wall for preventing the passage of material through the space between said wall and bottom, a sliding gate adjustably secured at the rear of the receptacle and immediately above the conveyor for regulating the amount of material discharged therefrom, means driven by said wheeled support for operating said conveyor, means for placing said conveyor in and out of operation, and a sectional removable false bottom located above the forward portion of the conveyor and within the container for relieving the weight of material in the container on the conveyor.

In testimony whereof I have affixed my signature.

FRANK NIEHAUS.